United States Patent [19]

Tokarz

[11] Patent Number: 5,797,422
[45] Date of Patent: Aug. 25, 1998

[54] FAUCET HANDLE ASSEMBLY

[75] Inventor: Steven John Tokarz, Indianapolis, Ind.

[73] Assignee: Masco Corporation of Indiana, Indianapolis, Ind.

[21] Appl. No.: 770,672

[22] Filed: Dec. 20, 1996

[51] Int. Cl.$^6$ ............................ F16K 31/60; F16K 43/00
[52] U.S. Cl. ............... 137/315; 16/114 R; 16/DIG. 40; 74/548; 251/292; 403/3
[58] Field of Search ..................... 16/114 R, 121, 16/DIG. 30, DIG. 40, DIG. 41; 74/543, 545, 548, 553, 557; 137/15, 315, 291, 292; 403/3, 256, 258, 260, 362, 299

[56] References Cited

U.S. PATENT DOCUMENTS

| | | | |
|---|---|---|---|
| 956,095 | 7/1910 | Filson | 251/292 |
| 1,106,933 | 8/1914 | Farley | 74/548 |
| 1,829,365 | 10/1931 | Meyer | 251/292 |
| 3,301,580 | 1/1931 | Greitzer | 16/121 |
| 3,791,402 | 2/1974 | Shuler | 74/548 |
| 4,065,216 | 12/1977 | Nelson | 74/548 |
| 4,471,842 | 9/1984 | Fox | 16/114 R |
| 4,479,736 | 10/1984 | Evans et al. | 16/114 R |
| 4,616,673 | 10/1986 | Bondar | 137/315 |
| 4,794,945 | 1/1989 | Reback | 137/315 |
| 4,842,009 | 6/1989 | Reback | 137/315 |
| 5,025,826 | 6/1991 | Schoepe et al. | 137/315 |

*Primary Examiner*—George L. Walton
*Attorney, Agent, or Firm*—Edgar A. Zarins; Malcolm L. Sutherland

[57] ABSTRACT

A handle construction for operation of a faucet which minimizes assembly parts while enhancing performance of the handle. The handle assembly includes a base which is secured to the operating valve of the faucet for operational control of fluid flow through the faucet. An upper end of the base has a horizontally disposed tubular seat adapted to receive a lever body and an axial spindle extending through the body. The spindle is threadably received within the seat to retain the lever body within the seat. The lever body is interchangeable to alter the aesthetic appearance of the faucet handle.

8 Claims, 2 Drawing Sheets

5,797,422

FAUCET HANDLE ASSEMBLY

BACKGROUND OF THE INVENTION

I. Field of the Invention

This invention relates to a lever-type handle for a faucet and, in particular, to a lever handle assembly which incorporates a minimum of parts yet allows interchange of the decorative body.

II. Description of the Prior Art

In order to appeal to the tastes and preferences of a wide range of consumers, faucets are offered with various handle configurations. Single handle faucets incorporate one handle to control both the temperature and volume of fluid flow according to the position of the handle. Two handle faucets facilitate independent control of the hot and cold water for mixing and outflow through the spout. Fluid flow volume is controlled through the handles while the temperature is determined by the proportion of hot and cold water flowing through the spout. Each of the handles is connected to valve which controls the volume of flow to the spout. Rotation of the valve stem, which is connected to the handle, increases or decreases the fluid flow.

Typical two handle faucet assemblies are offered with knobs or levers to control fluid flow. The lever handles are disposed outwardly and require that the lever be pivoted towards the spout to initiate water flow. In the past, the entire lever handle assembly needed to be replaced to alter the appearance of the faucet. More recently, such lever handles allow replacement of the lever body which may be metal such as chrome or brass, wood, porcelain or a clear plastic. This minimized inventory requirements since the lever assembly could be supplied separately. However, the known lever assemblies require substantial fastening hardware to secure the decorative body to the handle base. Such hardware included a set screw to secure an axial spindle and a nut threadably engageable with the spindle to secure the decorative lever body. In addition to requiring inventory of substantial hardware, each of these individual fastening means is subject to wearing out requiring replacement.

SUMMARY OF THE PRESENT INVENTION

The present invention overcomes the prior known lever handle assemblies for a faucet by providing a handle which requires a minimum of components to secure the decorative lever body to the lever base.

The faucet handle assembly of the present invention includes a base adapted to cooperate with a valve for controlling the flow of fluid to the faucet spout. The base is coaxially secured to the valve for transmitting rotational movement to the valve. At an upper end of the base a transverse cylinder is formed. In a preferred embodiment, the cylinder includes two sets of threads for assembling the faucet handle. An outwardly disposed end of the cylinder includes a seat for receiving a handle body. The handle body provides the decorative accent to the handle assembly and may be made of metal such as chrome or brass, wood, porcelain or plastic. The body incorporates an axial throughbore adapted to matingly receive a spindle. The spindle includes a decorative head and a threaded shank. The shank extends through the handle body to threadably engage the threads within the base while positioning the body within the cylinder seat of the base. The spindle and the handle body include cooperating splines to fix the body to the spindle allowing simultaneous rotation to tighten the faucet handle. As a result, the body is captured between the spindle head and the cylinder seat. The construction of the present invention minimizes the fastening hardware by utilizing a single spindle to secure the handle body on the handle assembly.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
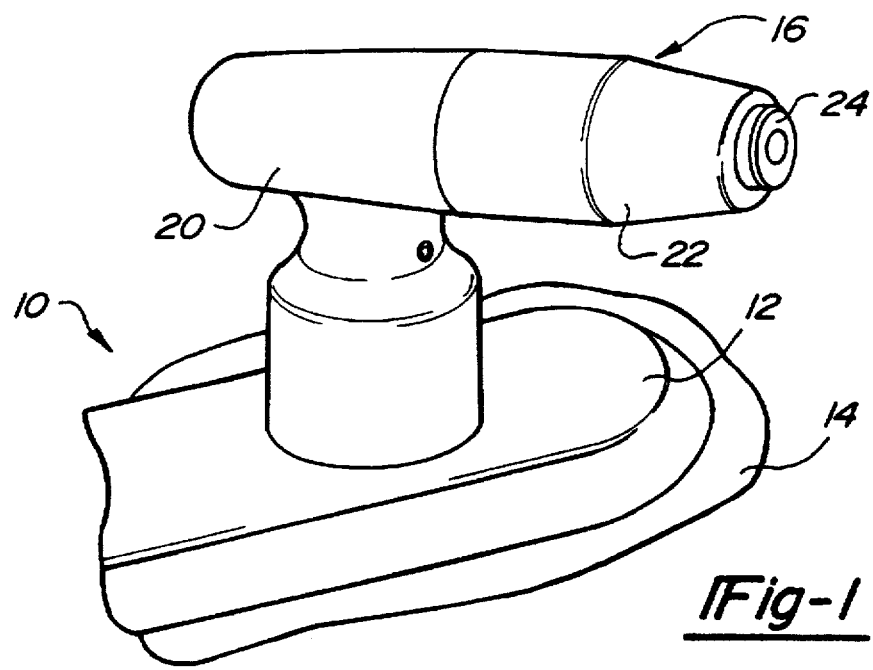
FIG. 1 is a perspective view of a lever handle for a faucet embodying the present invention.

Referring first to FIG. 1, there is shown a partial view of a two handle faucet 10 including a base or escutcheon 12 mounted to a sink tap 14. A lever-type handle 16 is secured thereto for controlling the flow of water to the faucet spout (not shown). As is well known, rotating the lever handle 16 inwardly towards the spout increases fluid flow by transmitting rotation to an internal valve operably connected to the handle 16. Conversely, rotating the lever handle 16 outwardly will reduce or shut-off fluid flow to the spout. The lever handle 16 is used in two-handle faucets 10 to independently control the flow of hot and cold water. The present invention provides a lever handle 16 which minimizes parts and simplifies assembly.

Figure 2:
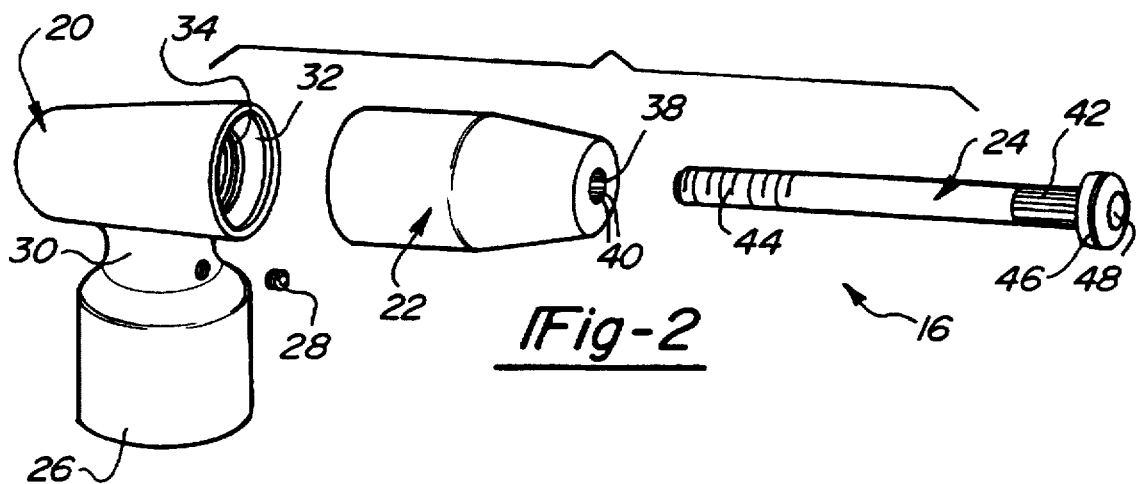
FIG. 2 is an exploded view of the handle.
Figure 4:
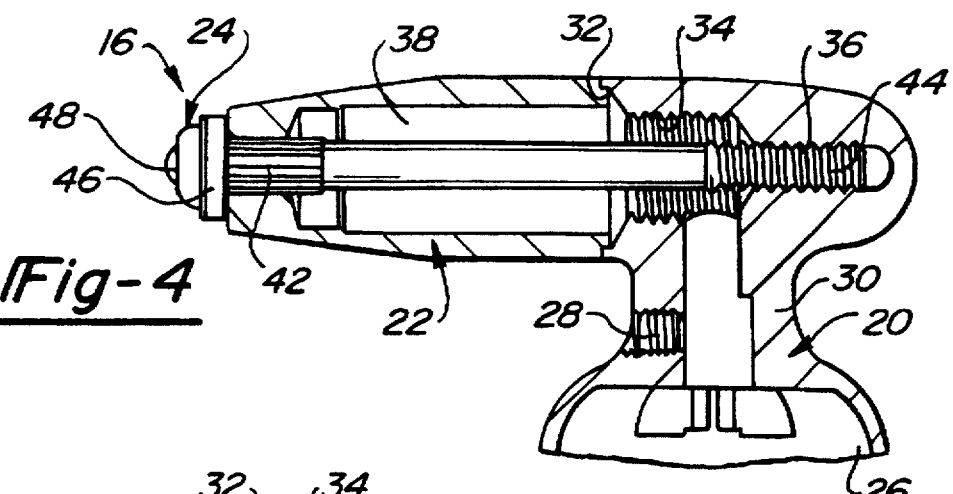
FIG. 4 is a cross-sectional view of the first embodiment of the handle.

Referring now to FIGS. 2 and 4, the lever handle 16 incorporates three primary elements: a base 20, a lever body 22 and a spindle 24 for securing the body 22 to the base 20. The base 20 includes an enclosure 26 at its lower end adapted to matingly engage the valve stem of the faucet valve. A set screw 28 in a neck portion 30 of the base 20 secures the base 20 to the valve such that rotation of the base 20 is transmitted to the valve. Disposed above the neck portion 30 is a horizontally disposed seat 32. Formed within the seat 32 are a pair of coaxial threaded bores open to the seat 32 and disposed substantially horizontal. A first larger diameter threaded bore 34 is formed substantially at the seat opening 32. A second smaller diameter threaded bore 36 is formed at the rear of the first bore 34. The coaxial bores 34 and 36 allow the base 20 to be used as part of the different embodiments of the faucet handle as will be subsequently described.

In a first embodiment of the faucet handle 16 shown in FIGS. 2 and 4, the handle body 22 is positionally captured within the seat 32 by the spindle 24. The body 22 includes an axial throughbore 38 through which the spindle 24 extends. Preferably, a portion of the throughbore 38 incorporates a set of splines 40 which cooperate with mating splines 42 on the spindle 24 to lock the handle body 22 on the spindle 24. The spindle 24 includes threads 44 adapted to threadably engage the small threaded bore 36. A decorative head 46 is formed at an outer end of the spindle 24. Because of the mating splines 40,42, the handle can be tightened by turning the lever body 22 once the spindle 24 is initially threaded into the smaller diameter threaded bore 36.

The faucet handle assembly allows simple interchange of the handle body 22 yet secure mounting of the body 22 on the handle 16. The spindle 24 is fed through the throughbore 38 of the body 22 until the head 46 engages the end of the body 22. Threads 44 of the spindle 24 engage second threaded bore 36 until the body 22 is firmly seated against the base 20.

Figure 3:
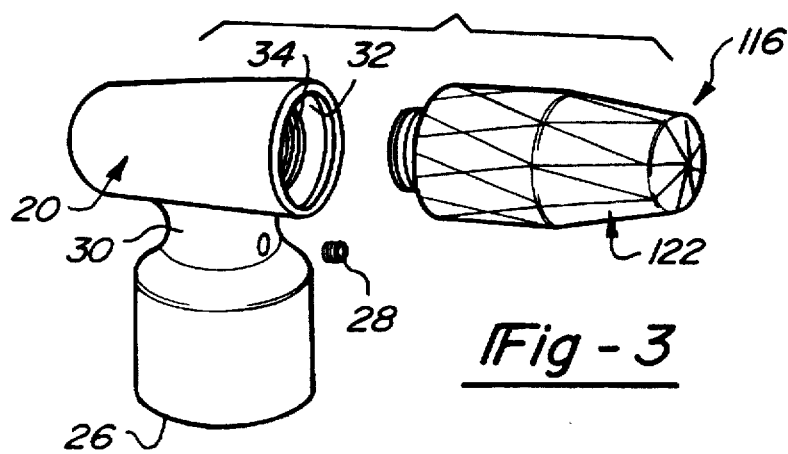
FIG. 3 is an exploded view of an alternative embodiment of the faucet handle.
Figure 5:
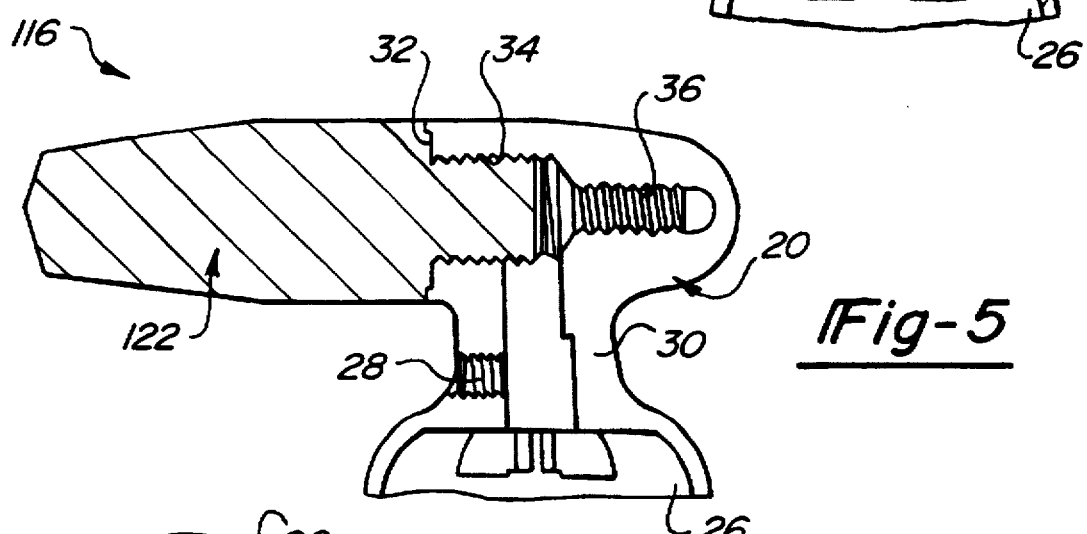
FIG. 5 is a cross-sectional view of the alternative embodiment of the handle.
Figure 6:
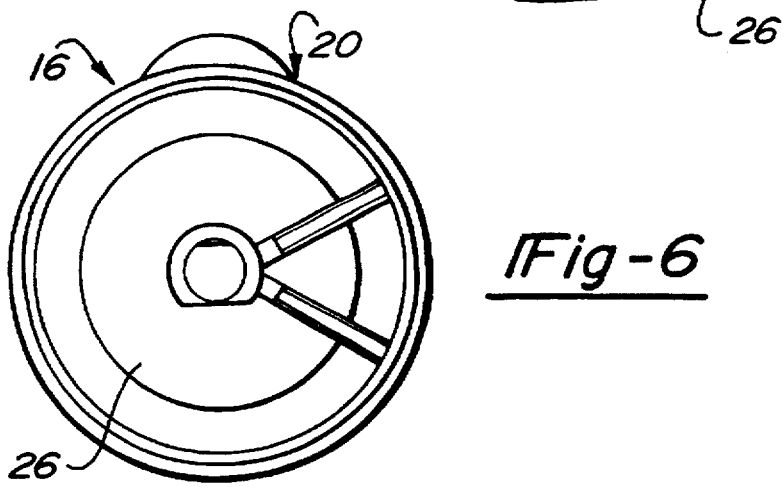
FIG. 6 is a bottom view of the handle.
Figure 7:
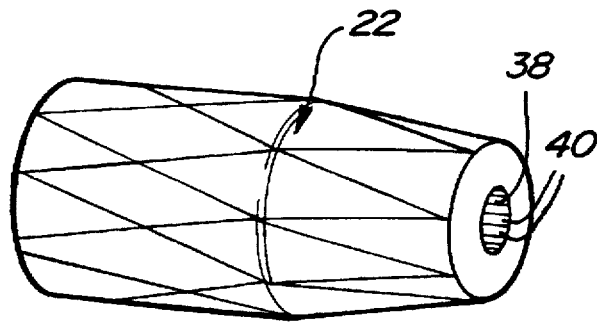
FIG. 7 is a perspective view of the handle body.

An alternative embodiment of the faucet handle 116 is shown in FIGS. 3 and 5 which incorporates the same base 20 resulting in a substantial reduction of inventory. A handle body 122 does not include a throughbore but rather incorporates a threaded shank 123 which threadably engages the first threaded bore 34 to secure the body 122 to the base 20. The solid handle body 122 is used when a decorative metal end is not desired such as presented by the spindle head 46 of the first embodiment. Nevertheless, the handle body 122 is interchangeably secured to the base 20. Since the identical base 20 with its dual threaded bores 34 and 36 can be used for both embodiments a substantial savings in inventory requirements results.

The foregoing detailed description has been given for clearness of understanding only and no unnecessary limitations should be understood therefrom as some modifications will be obvious to those skilled in the art without departing from the scope and spirit of the appended claims.

What is claimed is:

1. A faucet handle kit assembly for selectively controlling the flow of fluid through a faucet, said handle kit assembly comprising:

a base adapted to cooperate with a valve of the faucet, said base including a seat having first and second threaded bores coaxially disposed within said seat of said base, said first bore having a larger diameter than said second bore;

a plurality of handle bodies adapted to be disposed within said seat of said bore; and means for securing said plurality of handle bodies on said seat of said base, said means threadably cooperating with one of said first and second threaded bore to secure interchangeable handle bodies in said seat;

said first and second threaded bore adapted to receive interchangeable plurality of handle bodies, an exterior portion of said plurality of handle bodies abuttingly engaging an exterior surface of said base adjacent said first bore, one of said handle bodies being threadably received in said first threaded bore and the other of said handle bodies being received in said second threaded bore for fixedly securing the handle bodies in their respective bores.

2. The handle assembly as defined in claim 1 wherein said first and second threaded bores coaxially disposed within said seat of said base have a smaller diameter than said seat.

3. The handle assembly as defined in claim 2 wherein said means for securing said body comprises a spindle extending through an axial throughbore of said handle body and threadably engaging said second threaded bore of said base to positionally capture said body against said seat of said base.

4. The handle assembly as defined in claim 3 wherein said spindle includes a head selectively engaging said handle body such that said body is positionally captured between said spindle head and said seat of said base.

5. The handle assembly as defined in claim 3 wherein said spindle includes a plurality of splines and said handle body includes a plurality of splines, said handle body splines cooperating with said spindle splines to secure said body to said spindle such that rotation of said handle body is transmitted to said spindle.

6. The handle assembly as defined in claim 3 wherein said handle body includes a peripheral shoulder formed at an inner end thereof, said shoulder cooperating with said seat of said base to center said handle body on said base.

7. A faucet handle kit assembly for selectively controlling the flow of fluid through a faucet, said handle kit assembly comprising:

a base adapted to cooperate with a valve of the faucet, said base including a laterally disposed seat having first and second coaxial bores formed therein, said first bore having a greater diameter than said second bore and said seat having a greater diameter than said first bore;

a plurality of interchangeable handle bodies adapted to be disposed within said seat of said base; and means for interchangeably securing said plurality of handle bodies on said seat of said base, said means threadably cooperating with one of said first and second threaded bore to secure said body in said seat of said base;

said first and second threaded bore adapted to receive interchangeable plurality of handle bodies, an exterior portion of said plurality of handle bodies abuttingly engaging an exterior surface of said base adjacent said first bore, one of said handle bodies being threadably received in said first threaded bore and the other of said handle bodies being received in said second threaded bore for fixedly securing the handle bodies in their respective bores.

8. A faucet handle kit assembly for selectively controlling the flow of fluid through a faucet, said handle kit assembly comprising:

a base adapted to cooperate with a valve of the faucet, said base including a seat having first and second threaded bores coaxially disposed within said seat of said base, said first bore having a larger diameter than said second base;

a plurality of handle bodies adapted to be interchangeably disposed within said seat of said base; and means for interchangeably securing said plurality of handle bodies on said seat of said base, said means threadably cooperating with one of said first and second threaded bores to secure interchangeable handle bodies in said seat;

said first and second threaded bore adapted to receive interchangeable plurality of handle bodies, an exterior portion of said plurality of handle bodies abuttingly engaging an exterior surface of said base adjacent said first bore, one of said handle bodies being threadably received in said first threaded bore and the other of said handle bodies being received in said second threaded bore for fixedly securing the handle bodies in their respective bores.

* * * * *